United States Patent
Naik

(10) Patent No.: US 11,128,998 B2
(45) Date of Patent: Sep. 21, 2021

(54) LOCATION-BASED DYNAMIC INFORMATION PROVISION SYSTEM FOR LABORATORY ENVIRONMENTS HAVING MULTIPLE DIAGNOSTIC APPARATUS

(71) Applicant: Siemens Healthcare Diagnostics Inc., Tarrytown, NY (US)

(72) Inventor: Sandeep M. Naik, Bridgewater, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/607,866

(22) PCT Filed: May 7, 2018

(86) PCT No.: PCT/US2018/031364
§ 371 (c)(1),
(2) Date: Oct. 24, 2019

(87) PCT Pub. No.: WO2018/213046
PCT Pub. Date: Nov. 22, 2018

(65) Prior Publication Data
US 2020/0196115 A1 Jun. 18, 2020

Related U.S. Application Data

(60) Provisional application No. 62/507,450, filed on May 17, 2017.

(51) Int. Cl.
*H04W 4/00* (2018.01)
*H04W 4/33* (2018.01)
(Continued)

(52) U.S. Cl.
CPC ............ *H04W 4/33* (2018.02); *H04W 4/023* (2013.01); *H04W 4/80* (2018.02)

(58) Field of Classification Search
CPC .......... H04W 4/33; H04W 4/80; H04W 4/023
See application file for complete search history.

(56) References Cited

U.S. PATENT DOCUMENTS 8,223,032 B2 7/2012 Van Gorp et al.
8,620,682 B2 12/2013 Bechtel et al.
(Continued)

OTHER PUBLICATIONS

International Search Report for PCT/US2018/031364 dated Aug. 1, 2018.

*Primary Examiner* — Pakee Fang

(57) ABSTRACT

A location based dynamic information provision system integrates operator positional awareness within a laboratory environment with a laboratory environment asset site map. At least one operator proximity metric, defining a distance threshold for establishing whether an operator within the laboratory is proximate to a respective asset, is defined for each asset. Operator detection and position is provided by an indoor positioning system. A signaling device associated with each operator is in communication with a laboratory process management platform for receiving operator information contingent upon the respective operator being within the proximity metric for a respective laboratory asset and the asset having communicated status of a given urgency to the process management platform. The signaling device may enable the operator to communicate with the process management platform and may provide a tactile or other attention attracting signal to the operator.

19 Claims, 5 Drawing Sheets

(51) Int. Cl.
*H04W 4/80* (2018.01)
*H04W 4/02* (2018.01)

(56) References Cited

U.S. PATENT DOCUMENTS

| | | | |
|---|---|---|---|
| 9,338,609 B2 | 5/2016 | Heydlauf | |
| 2003/0095278 A1* | 5/2003 | Schwartz | G03G 15/55 358/1.14 |
| 2015/0208206 A1* | 7/2015 | Heydlauf | H04W 4/029 455/411 |
| 2015/0326704 A1* | 11/2015 | Ko | H04M 1/7253 455/456.3 |
| 2016/0196648 A1* | 7/2016 | Madabhushi | G06T 7/0012 382/131 |
| 2018/0012356 A1* | 1/2018 | Madabhushi | G06K 9/6267 |
| 2018/0365829 A1* | 12/2018 | Madabhushi | G06K 9/6269 |
| 2019/0213736 A1* | 7/2019 | Varekamp | G06T 7/0012 |

\* cited by examiner

LOCATION-BASED DYNAMIC INFORMATION PROVISION SYSTEM FOR LABORATORY ENVIRONMENTS HAVING MULTIPLE DIAGNOSTIC APPARATUS

RELATED APPLICATIONS

This application claims priority of U.S. Prov. Pat. Appl. No. 62/507,450, filed May 17, 2017.

FIELD OF THE DISCLOSURE

The disclosure herein relates generally to the field of selectively signaling an operator with the status of a diagnostic apparatus within a laboratory when the operator is detected to be within a predefined distance from the diagnostic apparatus.

BACKGROUND

Typical contemporary clinical laboratories include many individual diagnostic apparatus for maximum test throughput. However, in the interest of cost efficiency, manpower is minimized as much as possible. Under certain circumstances, it becomes challenging for an operator to manage the workload given the density of laboratory apparatus within a single facility.

Certain laboratory management software implementations enable the optimization of laboratory assets through a centralized platform, inside or outside the laboratory. One example of such a software implementation is the ATELLICA® Process Manager. Centralized control and workflow management for disparate apparatus or instruments within a laboratory enables efficient clinical operations. Workflow may be balanced between instruments and analytics may enable improved instrument usage. Trends may be analyzed through the use of such a platform to facilitate laboratory planning for growth.

A particular benefit of such software platforms is the ability to observe the status of constituent apparatus or instruments within a laboratory environment from one location, including the management of consumables, reviewing test progress and estimated turn-around time for various tests, and viewing and analyzing alerts associated with any of the instruments within the laboratory. Such alerts may be the result of low levels of consumables, environmental control failures, or other detected instrument malfunctions. A 3-D rendered graphic view of the laboratory with constituent instruments illustrated may facilitate the identification of an instrument requiring operator attention. For example, a color-coded flag or other icon may be presented on the displayed graphical representation in association with a respective instrument requiring attention.

While such centralized monitoring and control facilitates the management of many instruments from one location, it still requires the operator to then proceed to the apparatus issuing a status indicator, alert, or alarm requiring attention to address the source of an issue. If this apparatus is physically distant from the computing resource implementing the centralized laboratory manager, the operator may need to traverse between the two multiple times in order to fully resolve an issue with the diagnostic apparatus, leading to inefficiencies in the work of the operator and delays in the resolution of issues associated with one or more laboratory instruments or apparatus.

Accordingly, it would be desirable to provide a system and method for signaling and providing information to an operator when that operator is proximate to an instrument or apparatus requiring attention rather than requiring the operator to move from one location within the laboratory to another distant location.

SUMMARY

Disclosed herein is a laboratory process management platform that integrates operator positional awareness with a laboratory environment asset site map. Each diagnostic asset within the laboratory, also referred to as a diagnostic apparatus or laboratory instrument, has a location defined within the asset site map. The asset location may be absolute with respect to a laboratory layout or map, or may be relative with respect to one or more reference markers associated with the laboratory.

The laboratory process management platform is implemented by a computer server having at least one microprocessor executing instructions stored in associated memory. The associated memory also provides storage for at least one dataset, as described herein. Communication between the process management platform and the other elements within the laboratory may be via a wireless transceiver or wired connection.

Also defined for each asset is at least one operator proximity metric. Each metric defines a distance threshold for establishing whether an operator, detected within the laboratory, is to be considered proximate to the respective asset. The operator proximity metric may be defined with respect to a minimum distance between an operator and one portion of the asset, or may be with respect to a minimum distance between an operator and a defined point within the physical boundary of the asset. Each laboratory asset may have its own unique value for a respective operator proximity metric. Alternatively, a common operator proximity metric value may be assigned to all laboratory assets of the same class, attribute or functionality. Further still, all laboratory assets may have the same operator proximity metric.

Operator detection and positional awareness is provided through the use of an indoor positioning system. Such a system may use one or more bands of electromagnetic energy to locate one or more operators within the physical extent of the laboratory. For example, the system may operate using acoustic or optical signals, magnetic fields, or radio waves. The system may also operate using the interaction between an operator-carried or -worn emitter and distributed receivers or an operator-carried or -worn passive resonant circuit and distributed emitters, such as RF radiators. Biometric sensors, such as floor-mounted weight detectors, may also be used to detect one or more operators.

Operators may be detected as generic individuals within the laboratory by the indoor positioning system or may be uniquely identified through operation of the indoor positioning system and functionality provided by the process management platform based upon input from the indoor positioning system such as biometric identification. Such identification may operate through the gathering of still images or video streams by the indoor positioning system and the processing of the images or streams by the process management platform to identify certain operators. Alternatively, each signaling device, carried or otherwise associated with an operator (discussed below), may communicate with the process management platform and may be used to uniquely identify the respective operator or to define the seniority, class, or skill set of the respective operator. Operator proximity metrics may also be defined with respect to uniquely identified operators or operators of a certain seniority or skill set.

Thus, each diagnostic apparatus may have one operator proximity metric, plural metrics employed based upon diagnostic apparatus status, and/or plural metrics employed based upon operator identity or classification.

Each operator assigned to maintain or otherwise interact with laboratory assets is provided with a signaling device that is in at least one-way communication with the laboratory process management platform. The signaling device may be provided in the form of a wrist-worn device such as a wrist watch or smart watch, wirelessly communicating wristband, or other arm or hand worn digital communications interface, a smartphone, a beeper, or a wirelessly communicating tablet computer. Other signaling devices may be employed.

Each signaling device is capable at least of receiving operator information. The provision of operator information to the signaling device associated with a particular operator is contingent upon a determination that the respective operator is within a minimum distance from a particular laboratory asset, the minimum distance being defined by the operator proximity metric for that laboratory asset. In addition, operator information is only provided to an operator at a distance within the operator proximity metric for that asset if the asset has communicated a status, alarm, or other indication of a certain characteristic to the laboratory process management platform. The platform analyzes communications from each laboratory asset to assess, based upon predefined rules or thresholds, whether a communication is indicative of a condition that requires action on the part of an operator when proximate to the respective asset. If so, an appropriate message is conveyed as the operator information to the signaling device to be perceived by the operator and to result in the operator taking required maintenance action with respect to the laboratory asset. Alternatively, the operator information may result in the operator performing diagnostic activity with respect to the laboratory asset. Further, the signaling device may enable the operator to communicate current status information, observed conditions, or actions undertaken to the laboratory process management platform. The operator and the laboratory process management platform may engage in an interactive exchange until an error condition is properly resolved, sufficient data with respect to the subject laboratory asset has been gathered, and/or the laboratory process management platform has determined that further service or maintenance for the respective laboratory asset is required.

In order to assure the operator is made aware of the operator information provided to the signaling device, the latter may in one embodiment facilitate the provision of a tactile or other attention attracting signal to the operator, such as through vibratory, audible, or visual cues. The intensity of such cues may increase with increasing proximity to the laboratory asset requiring operator attention or may be indicative of a seriousness or level of urgency of the laboratory asset communication upon which the operator information is premised.

If an operator is located within the proximity metric for each of two or more diagnostic apparatuses requiring operator intervention, the laboratory process management platform may determine which asset is communicating a status or alarm condition of a higher degree of importance or immediacy and prioritizing the delivery of operator information accordingly.

It is an object of the location based dynamic information provision system and method disclosed herein to enable the communication of operator information to an operator via a respective signaling device when the operator is detected within a predefined distance from a laboratory asset requiring attention.

It is a further object of the location based dynamic information provision system and method disclosed herein to provide a tactile, audible, and/or visual cue to the operator via the respective signaling device when operator information is conveyed to the signaling device.

It is a further object of the location based dynamic information provision system and method disclosed herein to limit the distance to be traveled by an operator in attending to laboratory asset conditions of a non-critical nature, based upon proximity to a laboratory asset requiring attention.

BRIEF DESCRIPTION OF THE DRAWINGS

Illustrative embodiments of the disclosed technology are described in detail below with reference to the accompanying figures. It will be appreciated that, for simplicity and clarity of illustration, elements shown in the drawings have not necessarily been drawn accurately or to scale. Further, where considered appropriate, reference numerals may be repeated among the drawings to indicate corresponding or analogous elements. For purposes of clarity, however, not every component may be labeled in every drawing. The figures are provided for the purposes of illustration and explanation and are not intended as a definition of the limits of the invention. In the figures.

DETAILED DESCRIPTION

Figure 1:
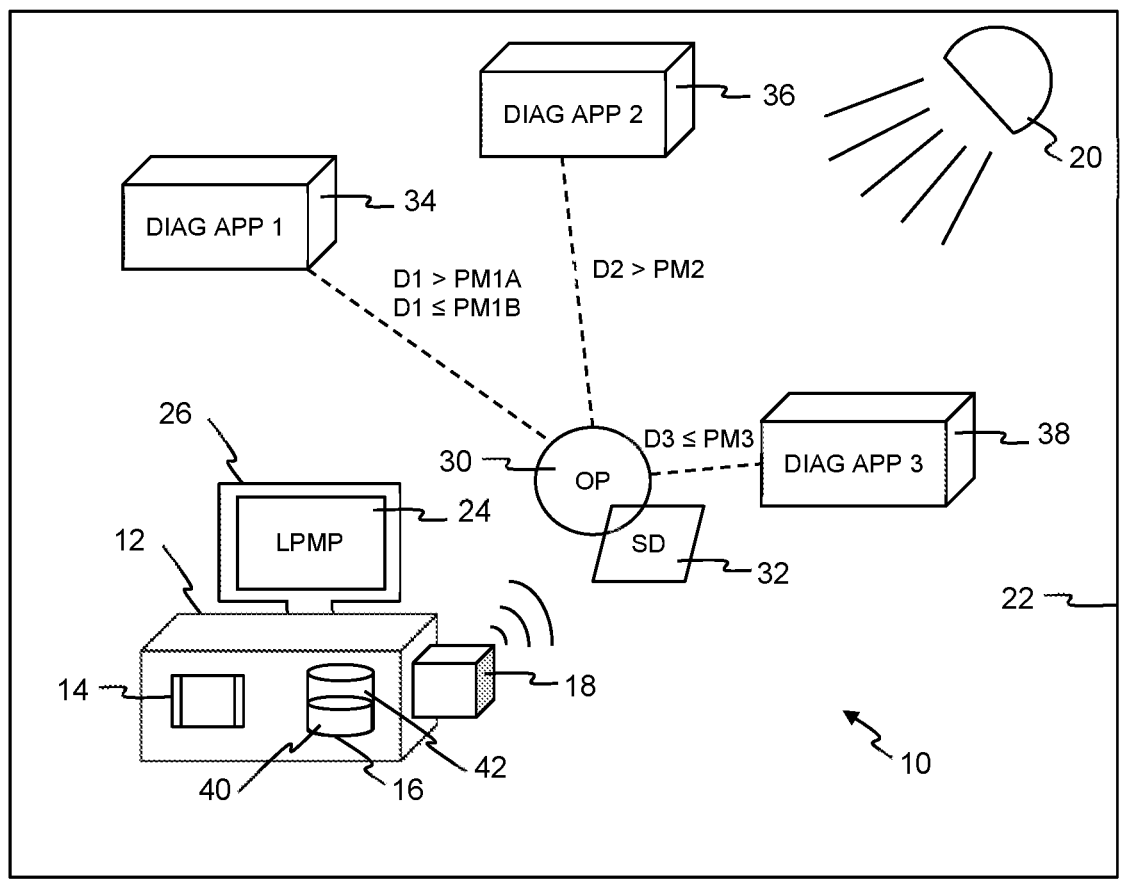
FIG. 1 is a schematic view of a laboratory environment in which a location based dynamic information provision system and method according to the present disclosure are implemented.

In the following detailed description, numerous specific details are set forth in order to provide a thorough understanding of the various embodiments of the present invention. It will be understood by those of ordinary skill in the art that these embodiments of the present invention may be practiced without some of these specific details. In some instances, well-known methods, procedures, components and structures may not be described in detail so as not to obscure the embodiments of the present invention.

The presently disclosed system and method are directed to providing an alert or other information to an operator when an indoor positioning system detects the presence of the operator within a predefined threshold distance with respect to a diagnostic apparatus, such as a medical laboratory instrument or laboratory analyzer. Diagnostic apparatus, laboratory instrument, and laboratory asset are used interchangeably. Such apparatus may all be of the same type, or may vary according to function, throughput, speed, etc. While the present system and method are described in the context of a medical laboratory, they also find utility in various contexts, including industrial manufacturing and processing facilities for a wide variety of applications.

Providing an alert or other information to an operator via a signaling device when the operator is close to an asset requiring attention enables the prompt resolution of an asset function degradation or error state, thereby improving the overall productivity of the laboratory.

To achieve this system and method, a process management platform, implemented by a computer server, is provided with a laboratory asset map. Each diagnostic apparatus (or industrial machine in other contexts) is located within the asset map. This may be realized in a number of ways. For example, the physical outline of each asset may be located out in a two-dimensional map of a laboratory space. Alternatively, an asset reference point or points may be defined within such a laboratory space map. The asset locations thus provided may be relative to the boundaries of the respective laboratory or may be with respect to another reference system such as a building in which the laboratory is located.

The laboratory asset map may be constructed by measuring the boundaries of the laboratory and the dimensions of each diagnostic apparatus therein, then associating the location of each diagnostic apparatus with respect to the boundaries of the laboratory. Alternatively, a reference point or points associated with each asset may be located within the laboratory map at appropriate locations. Further still, an optical mapping system, using one or more cameras having fields of view within the laboratory, may be used to automatically locate each diagnostic apparatus within the laboratory and to automatically construct the asset map on the basis of the optical imaging.

Once each diagnostic apparatus is located within the laboratory asset map, either by defining the physical extent of each asset within the map or by defining the location of one or more respective reference points for each asset within the map, then at least one operator proximity metric is defined for each diagnostic apparatus and stored within an operator proximity metric batabase. This metric is a threshold distance value, measured with respect to a respective diagnostic apparatus. In certain embodiments, the metric is measured with respect to multiple locations along the physical extent of the respective instrument. For example, the metric may be a ten meter wide perimeter about the respective asset. Alternatively, the metric may be measured with respect to one or more reference points defined proximate to or within the footprint of the respective asset. For example, the metric may be a circle having a ten meter radius, centered at a point within the center of a respective laboratory instrument.

Each diagnostic apparatus within a laboratory may have the same operator proximity metric, measured from each apparatus in the same manner. For example, each instrument may have ten meters from any peripheral edge or point of the instrument as the operator proximity metric. However, operator proximity metrics may vary, depending upon the type of diagnostic apparatus, its location within the laboratory, its history of maintenance issues, its criticality within the context of workflows carried out across plural diagnostic apparatus, etc. Thus, one operator proximity metric may be defined for all assets of a certain type or function, while other assets have differing operator proximity metrics.

Each diagnostic apparatus, groups of diagnostic apparatus, or all diagnostic apparatus may have more than one respective operator proximity metric. For example, when an apparatus is operating at a first level of functionality, it may have a first operator proximity metric. However, when the apparatus is operating at a second level of functionality, a different operator proximity metric may be engaged. Thus, when a diagnostic apparatus is operating normally and a status indication received by the process management platform indicates routine, low-priority maintenance is required, the process management platform may determine, based upon reference to the operator proximity metric database, that a shorter operator proximity metric is to be employed, whereby an operator is alerted to the low-priority maintenance issue only if the operator is relatively close to the respective apparatus, as will be discussed in greater detail below. However, if the diagnostic apparatus is operating in a degraded state and the status indication sent by the apparatus is reflective of that degraded state, the process management platform may utilize a wider operator proximity metric, predefined for the respective apparatus, in order to alert an operator to the need to attend to the apparatus even if the operator is not immediately adjacent or close to the apparatus.

All of the operator proximity metrics are collated within a database stored in memory associated with a computer server. In an illustrative embodiment, the laboratory environment asset map is also stored within the same memory or, in another embodiment, in a respective memory accessible by the computer server.

Operator presence and location is facilitated through the use of an indoor positioning system having a field of view covering the laboratory environment. Such a system may use one or more bands of electromagnetic energy to locate one or more operators within the physical extent of the laboratory. For example, the system may operate using acoustic signals, optical signals, magnetic fields, radio waves or infrared detection. The system may also operate using the interaction between an operator-carried or -worn emitter and distributed receivers or an operator-carried or -worn passive resonant circuit and distributed emitters, such as RF radiators. Biometric sensors, such as floor-mounted weight detectors, may also be used to detect one or more operators.

Operator detection, via the indoor positioning system and the process management platform, may result in the identification of a generic operator, may result in the identification of a predefined class, rank or role of operator, or may result in the identification of a particular operator. The latter may be achieved through the use of biometric identification functionality provided by the process management platform based upon input from the indoor positioning system. Images or video streams processed by the process management platform may be used to identify certain operators. Alternatively, each signaling device, carried or otherwise associated with a respective operator (discussed below), may communicate with the process management platform and may be used to uniquely identify the respective operator or to define the seniority, class, or skill set of the respective operator. In this case, each operator is thus provided with a signaling device that identifies the classification or identity of the respective operator. Thus, operators may be classified according to unique identity, seniority or skill set.

Each operator assigned to maintain or otherwise interact with laboratory assets is provided with a signaling device that is in at least one-way communication with the laboratory process management platform. The signaling device may be provided in the form of a wrist-worn device such as a wrist watch or smart watch, wirelessly communicating wristband, or other arm, hand, or belt worn digital communications interface, a smartphone, a beeper, or a wirelessly communication tablet computer. Other signaling devices may be employed.

In order to provide operator information to a signaling device, the location of the respective operator must be determined to be within a minimum distance from a particular laboratory asset, the minimum distance being defined by the operator proximity metric(s) for that laboratory asset. Further, the asset must have communicated a status, alarm, or other indication of a certain characteristic to the laboratory process management platform. The platform analyzes communications from each laboratory asset to assess, based upon predefined rules or thresholds stored in memory associated with and accessible by the process management platform, whether each communication is indicative of a condition that requires action on the part of an operator, or a particular class or identity of operator, when proximate to the respective asset. If so, an appropriate message directing the operator to take action with respect to the laboratory asset is sent to the respective signaling device as the operator information. Alternatively, the operator information may result in the operator performing diagnostic activity with respect to the laboratory asset. Further, the signaling device may enable the operator to communicate current status information, observed conditions, or actions undertaken to the laboratory process management platform. The operator and the laboratory process management platform or another operator interacting with the process management platform may engage in an interactive exchange until an error condition is properly resolved, sufficient data with respect to the subject laboratory asset has been gathered, and/or the laboratory process management platform has determined that further service or maintenance for the respective laboratory asset is not required.

In certain embodiments, the signaling device may facilitate the provision of a tactile or other attention attracting signal to the operator, such as through vibratory, audible, or visual cues. The intensity of such cues may increase with increasing proximity to the laboratory asset requiring operator attention or may be indicative of a degree of seriousness or level of urgency of the laboratory asset communication upon which the operator information is premised.

Embodiments of the presently disclosed system and method for location based dynamic information provision are described in conjunction with the drawings. A schematic diagram of apparatus implementing such a system 10 is provided in FIG. 1. A computer server 12 is provided for implementing a laboratory process management platform 24, which may be accessible to an operator through a video terminal 26 or through a mobile platform (not shown) or remote network connection (not shown). The server is comprised of at least one processor 14, a memory element 16 implementing at least one database 40, 42, and a communications interface 18 such as a radio or Bluetooth transceiver. Software implementing the process management system is stored within the memory.

The transceiver 18 is in communication with an indoor positioning system 20. This system, which may be based upon optical, radio, electromagnetic, or acoustic sensors, ideally has an effective field of view across enough of the respective laboratory environment 22 to detect and resolve the position of an operator (OP) 30 within the laboratory. The spatial resolution of the indoor position system may depend upon the needs of the implementation.

Also disposed within the laboratory environment 22 are one or more diagnostic apparatus 34, 36, 38. In FIG. 1, three such apparatus are illustrated and labeled Diag App 1, Diag App 2, and Diag App 3, respectively. The location of each apparatus within the laboratory environment is recorded within an asset map database 40 stored within the server memory 16. The physical boundaries of each asset, relative to the boundaries of the respective laboratory environment, may be stored within the asset map in one embodiment. Alternatively, or in addition thereto, one or more points of reference for each asset, relative to the laboratory environment, may be stored within the asset map.

At least one proximity metric is defined for each diagnostic apparatus 34, 36, 38 within the laboratory environment 22 and stored within a proximity metric database 42 within the memory 16 of the server 12 to be accessed by the server processor 14 implementing the laboratory process management platform 24. A proximity metric defines a distance within which an operator, detected by the indoor positioning system 20 within the laboratory environment, is considered proximate a respective diagnostic apparatus. Distance to the operator may be measured in one of several ways, including from the closest boundary of the respective diagnostic apparatus to the operator, from a physical center point of the respective diagnostic apparatus to the operator, or from one or more other reference points defined in association with the diagnostic apparatus.

Each diagnostic apparatus 34, 36, 38 may have its own unique proximity metric by which a detected operator 30 is determined to be proximate. Alternatively, diagnostic apparatus of a common class, functionality, throughput, age, maintenance history, etc. may be assigned a common proximity metric.

Further still, each diagnostic apparatus 34, 36, 38 may have the same proximity metric as every other diagnostic apparatus within the laboratory environment 22.

Each diagnostic apparatus 34, 36, 38 may further be defined plural proximity metrics. For example, one proximity metric may be associated by the laboratory process management platform 24 with a certain class or type of status information received from the respective diagnostic apparatus. Status information that, when processed by the process management system according to predefined response rules stored within the server memory 16, indicates a low priority response by an operator 30 is required may be correlated with a low priority proximity metric for that asset, stored within the proximity metric database 42. Such a low priority proximity metric may be relatively short, whereby operator information is only sent to a respective signaling device 32 when the operator is close to the asset. However, status information that, when processed by the process management system according to the predefined response rules, indicates a high priority response by the operator is required may be correlated with a high priority proximity metric for that asset, stored within the proximity metric database. Such a high priority proximity metric may be relatively long, whereby operator information is sent to the respective signaling device when the operator is farther away from the asset but at the same time within the high priority proximity metric as detected by the indoor positioning system 20 and conveyed to the laboratory process management platform.

Each diagnostic apparatus 34, 36, 38 may have plural proximity metrics associated therewith in the proximity metric database 42, or only select diagnostic apparatuses may have plural proximity metrics, the rest having one.

Each operator 30 within the laboratory environment 22 is provided with or assigned a signaling device 32. The signaling device may be one of a variety of devices such as a smart watch, a smart phone, a tablet computer, a body-worn communications interface, a beeper, etc. Requirements of the signaling device are that it be capable of selectively receiving operator information from the server 12 implementing the laboratory process management platform 24 via the communications interface 18. In certain embodiments, the signaling device is further capable of receiving input from the respective operator for communication back to the process management platform. Such information may include observed status of the diagnostic apparatus 34, 36, 38 or actions taken to resolve an issue associated with the diagnostic apparatus that was communicated to the operator with the operator information.

The functionality and type of the signaling device 32 associated with each operator 30 may vary according to the identity, skill set, or class of the operator.

The signaling device 34 in certain embodiments provides some form of tactile, audio and/or visual alert to the respective operator 30 in response to operator information of a certain class, level, or urgency. The alert to be provided may be determined by the signaling device based upon an analysis of the operator information, or may be commanded as part of the operator information from the laboratory process management platform 24.

In FIG. 1, the indoor positioning system 20 has detected an operator 30 within the laboratory environment 22 and has communicated the presence and location of the operator within the laboratory environment to the laboratory process management platform 24, implemented by the server 12, via the communications interface 18. If the process management platform determines one or more of the diagnostic apparatuses requires operator attention as a result of an analysis of data received from the diagnostic apparatuses, the process management platform refers to the asset map 40 and the proximity metric database 42 to determine if the detected operator is within a proximity metric for the respective diagnostic apparatus(es) requiring operator attention. The choice of proximity metric from among plural proximity metrics associated with a given diagnostic apparatus may be contingent on the analysis of asset data received by the process management platform and the classification or severity of that asset data based upon comparison to predetermined rules or thresholds stored within the server memory 16.

In FIG. 1, a first diagnostic apparatus 34 has two respective proximity metrics associated therewith, designated PM1A and PM1B, while two diagnostic apparatus 36, 38 each have one proximity metric, PM2 and PM3, respectively. PM1A is less than PM1B. Thus, for a low importance or less urgent status message from Diag App 1 assessed by the laboratory process management platform 24, PM1A is utilized to determine whether the operator 30 is proximate Diag App 1. As illustrated, D1>PM1A, so the operator is not considered proximate Diag App 1 and so operator information pertaining to the status information received by the proxess management platform is not conveyed to the signaling device. However, if the status information from Diag App 1, assessed by the process management platform by comparison with predefined levels or characteristics stored in the server memory 16, is of a higher or more urgent status, a broader or longer proximity metric PM1B is used for Diag App 1. As illustrated, D1<PM1B. Thus, the process management platform conveys operator information corresponding to the Diag App 1 status information to the signaling device 32 associated with the detected operator proximate Diag App 1.

As illustrated, if Diag App 2 36 had sent status data to the process management platform 24 indicative of a need for operator 30 intervention, operator information would not have been conveyed to the respective signaling device 32 as the distance D2 between the operator and Diag App 2 is greater than the respective, and only, proximity metric PM2.

However, if Diag App 3 had sent status data that when processed by the process management platform was indicative of a need for operator 30 intervention, the process management platform 24 would convey the appropriate operator information to the respective signaling device 32, according to predefined rules correlating received asset status data with operator action to be taken stored in server memory 16, because the distance D3 between the operator and Diag App 3 is less than or equal to the respective proximity metric PM3.

Figure 2A:
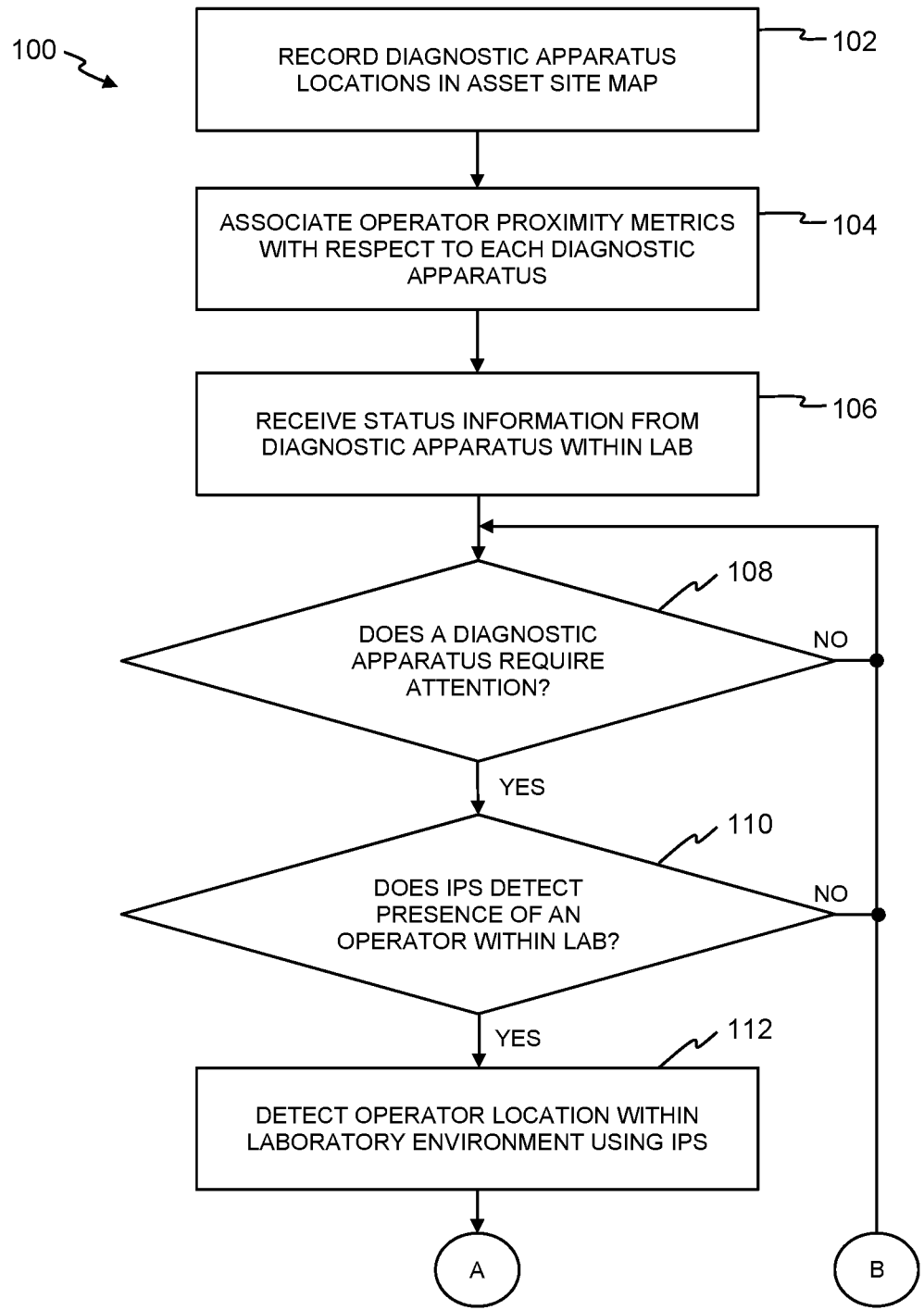
FIGS. 2A and 2B are a flow-chart of the location based dynamic information according to the present disclosure.
Figure 2B:
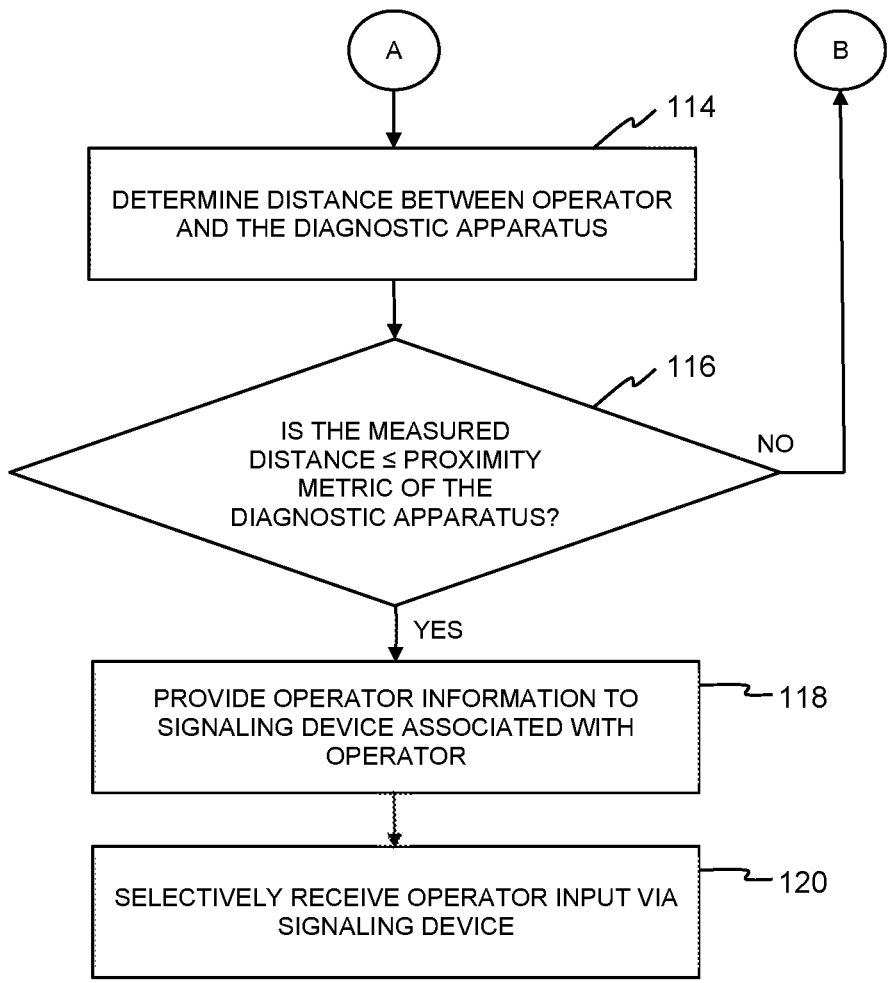

A method 100 of implementing a dynamic information provision system is presented in flowchart form in FIGS. 2A and 2B. At block 102, the locations of diagnostic apparatuses 34, 36, 38 within a laboratory environment 22 are recorded within an asset map 40 and stored in memory 16 of a server 12 having a processor 14 implementing a laboratory process management platform 24.

At block 104, one or more operator proximity metrics are associated with each diagnostic apparatus 34, 36, 38 within a proximity metric database 42 stored within memory 16 of the server 12 implementing the laboratory process management platform 24.

The process management platform 24 then receives, at block 106, status information from the diagnostic apparatus 34, 36, 38 within the laboratory environment 22 via the transceiver 18 associated with the server 12 (or, alternatively, via hard-wire connection). The process management platform compares the received status to predefined rules or thresholds for the respective diagnostic apparatus stored within the server memory 16 to determine, at block 108, if the respective diagnostic apparatus requires operator attention.

If the comparison of diagnostic apparatus 34, 36, 38 status information to predefined rules or thresholds by the process management platform 24 does not indicate the respective diagnostic apparatus requires operator attention, the method continues to monitor the status information received from the diagnostic apparatus within the laboratory environment and compare that status to the predefined rules or thresholds.

However, if the comparison of status to rules or thresholds of block 108 does indicate a need for operator attention at the respective diagnostic apparatus 34, 36, 38, the method proceeds to block 110, at which the process management system 24 determines, via input from the indoor positioning system (IPS) 20, whether an operator is detected within the laboratory environment 22. If not, the method returns to monitoring the received diagnostic status information at block 108.

It is understood that, while not illustrated, if the process management platform 24 receives diagnostic apparatus status information from one the laboratory assets 34, 36, 38 that, upon analysis, indicates operator 30 attention is required and no operator is detected by the indoor positioning system 20, other techniques for summoning an operator may be employed, such as sending an email, text, phone call, etc. to an operator outside the laboratory environment.

If, at block 110, an operator 30 has been detected within the laboratory 22, the specific location of the operator within the laboratory is established, at block 112, by the indoor positioning system and this location is conveyed to the process management platform 24.

With regard to FIG. 2B and at block 114, the process management platform 24, implemented by the server 12, determines the distance between the operator 30 and the diagnostic apparatus 34, 36, 38 requiring operator attention, as determined at decision block 108. This distance may be established with respect to the predefined asset map 40 stored within server memory 16. As discussed above, the asset map may provide an outline of the respective diagnostic apparatus or one or more reference points from which the operator distance is determined.

At decision block 116, the process management platform 24 compares the distance determined at block 114 to the proximity metric for the respective diagnostic apparatus 34, 36, 38 as referenced in the proximity metric database 42 stored within server memory 16. As discussed above, the diagnostic apparatus may have more than one proximity metric, to be selected based upon the analysis of the apparatus status performed at decision block 108. If the distance between the detected operator 30 and the respective diagnostic apparatus is greater than the respective proximity metric, the method returns to decision block 108.

However, if the process management platform 24 determines that the distance between the operator 30 and the respective diagnostic apparatus 34, 36, 38 is equal to or less than the respective proximity metric for that asset, the laboratory process management platform provides operator information to the operator via the respective signaling device 32 so that appropriate action may be taken with respect to that asset.

Once the operator 30 is engaged with the diagnostic apparatus 34, 36, 38 having a status that correlates to the need for operator intervention, the operator may optionally then utilize the respective signaling device 32 to provide information back to the process management platform 24 via the server communications interface 18. This information may be in the form of notes entered by the operator, or may be in response to specific queries provided to the operator as part of the operator information. Responses to the queries may be text-based, entered via a touch sensitive display screen or via a keypad provided on the signaling device, or may be via the selection of one or more options such as radio buttons or other graphical response gathering techniques provided on the signaling device.

Figure 3A:
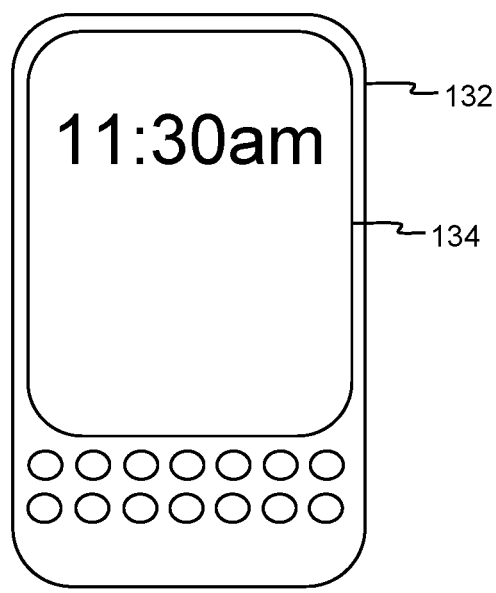
FIG. 3A is a schematic view of a signaling device of the system implemented within the laboratory environment of FIG. 1 in a dormant mode.

Non-limiting embodiments of a signaling device 132 are illustrated in FIGS. 3A through 3D. In FIG. 3A, a signaling device 132 is illustrated as a smartphone or tablet computer. As shown, the display screen 134 may provide basic information such as time when no operator information is received from the process management platform 24. Alternatively, the display may be blank and the signaling device may be in a low-power or sleep mode.

Figure 3B:
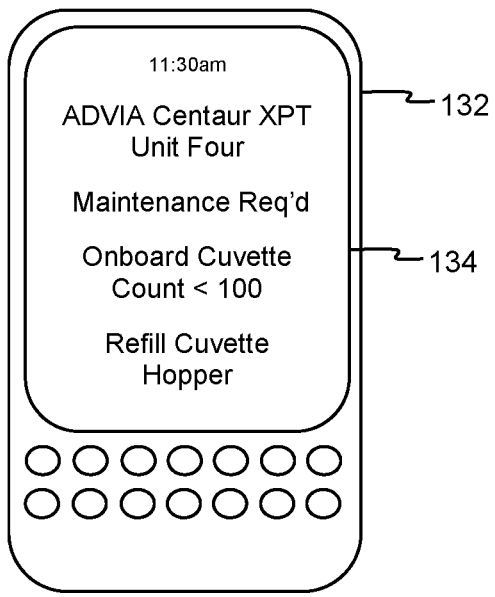
FIG. 3B is a schematic view of the signaling device of FIG. 3A displaying operator information.

When operator information is received by the signaling device 132, as illustrated in FIG. 3B, a textual and/or graphical representation of that information is presented on the display screen 134 of the device. As shown, the information provided in this embodiment identifies a particular diagnostic apparatus that the operator 30 is determined to be proximate to, such as Diag App 3 38 in FIG. 1. Action to be undertaken, e.g. "Refill Cuvette Hopper," is also presented. While not illustrated, the operator information may require the operator to take a certain action with respect to the signaling device in order to confirm that the operator information has been perceived by the operator and/or that the operator has acted according. A soft button displayed on the display screen may be used for these purposes.

Figure 3C:
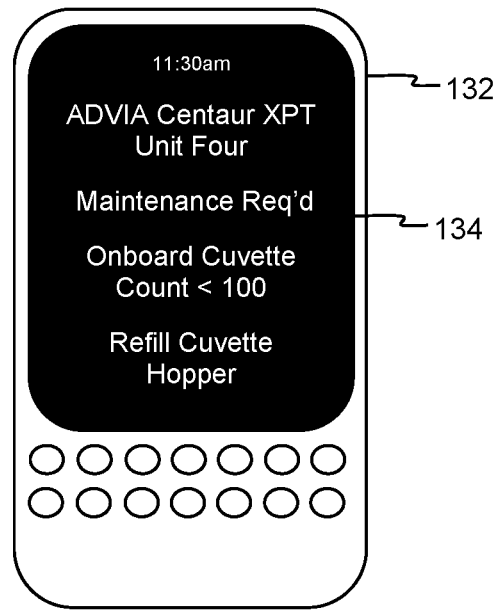
FIG. 3C is a schematic view of a further embodiment of the signaling device of FIG. 3B displaying operator information in a contrasting color compared to that displayed in FIG. 3B in order to attract the attention of the respective operator.

FIG. 3C illustrates the display screen 134 of the signaling device 132 presenting the operator information in a contrasting color as compared to that in FIG. 3B. The switch between contrasting colors may be repeated as a visual cue for gaining the attention of the operator 30.

Figure 3D:
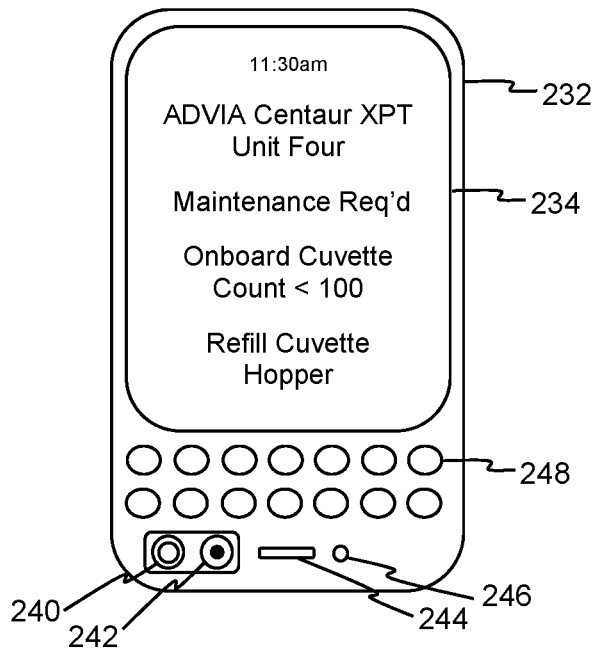
FIG. 3D is a schematic view of a further embodiment of the signaling device of FIG. 3B having various operator interface elements.

Another embodiment of a signaling device 232 according to the present disclosure is shown in FIG. 3D. As in the embodiments of FIGS. 3A-3C, this embodiment is provided with a keyboard or keypads 248 for receiving input from the operator 30, including enabling an operator to scroll through operator information displayed on the screen 234, providing confirmation of actions taken to the process management platform 24, or requesting additional instructions or information needed to carry out the necessary maintenance or other action.

The signaling device 232 in embodiment of FIG. 3D also illustrates additional optional components, including a camera 242 that may be used for recording visual aspects of the diagnostic apparatus to be attended to or for enabling visual communication between the operator 30 and another person such as at the process management platform 24, a light 240 that may either be used to selectively illuminate a portion of the diagnostic apparatus to be attended to or which may be used as an optical strobe to gain the attention of the respective operator, a speaker 244 for presenting at least a portion of the operator information to the operator in an audio format or for presenting an audio alert to the operator for gaining the attention of the operator to operator information received or being received by the signaling device. The speaker 244 may also be used in conjunction with a microphone 246 for enabling the operator to interactively speak with another person at the process management platform or elsewhere or to the process management platform itself via an artificial intelligence and voice recognition module implemented by the server 12 and integrated with the process management platform.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable media, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. It will be further appreciated by those of ordinary skill in the art that modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

The invention claimed is:

1. A location based dynamic information provision system for use in a laboratory environment having plural diagnostic apparatus, comprising:
    an indoor positioning system for detecting the presence of at least one operator within the laboratory environment and for detecting the location of the at least one operator relative to at least one of the plural diagnostic apparatus;
    a process management platform implemented by a computer server and at least one associated database for storing a laboratory environment asset site map and for storing operator proximity metrics for defining a maximum distance from each of the plural diagnostic apparatus for a user to be determined proximate thereto, the process management platform in communication with each of the plural diagnostic apparatus, for selectively receiving status information therefrom, and in communication with the indoor positioning system, for selectively receiving the detected location of the at least one operator, the process management platform for determining the proximity of the at least one operator to at least one of the plural diagnostic apparatus through reference to the laboratory environment asset site map; and
    a signaling device, associated with a respective operator within the laboratory environment and in communication with the process management platform, for selectively providing operator information to the respective operator in response to a communication from the process management platform when the process management platform has determined the operator is proximate to a respective one of the plural diagnostic apparatus on the basis of the detected location of the at least one operator and the operator proximity metrics, the provided information pertaining to the respective one of the plural diagnostic apparatus,
    wherein the received diagnostic apparatus status information is priority classified by the process management platform according to predefined response rules stored in the at least one associated database,
    wherein each diagnostic apparatus has associated therewith in the at least one associated database plural operator proximity metrics, each correlated with a respective priority classification of respective received diagnostic apparatus status information, and
    wherein an operator proximity metric correlated with a low priority classification is shorter than an operator proximity metric correlated with a high priority classification.

2. The system of claim 1, wherein the process management platform is further for deriving the operator information from the status information for a respective diagnostic apparatus to which the respective operator is proximate and for communicating the operator information to the signaling device.

3. The system of claim 2, wherein the operator information comprises at least some of the status information for the respective diagnostic apparatus to which the respective operator is proximate.

4. The system of claim 2, wherein the operator information comprises instructions for actions the respective operator is to execute with respect to the respective diagnostic apparatus to which the respective operator is proximate.

5. The system of claim 1, wherein the operator information is an alert message directing the respective operator to address a functional degradation of the respective diagnostic apparatus.

6. The system of claim 5, wherein the alert message causes the signaling device to provide a tactile signal to the respective operator.

7. The system of claim 5, wherein the alert message comprises at least one of an audible and a visual signal.

8. The system of claim 1, wherein the signaling device is selected from the group consisting of a wirelessly communicating wristwatch, a wirelessly communicating wristband, a smartphone, and a wirelessly communicating tablet computer.

9. The system of claim 1, wherein the signaling device comprises a speaker and the operator information is an audible message.

10. The system of claim 1, wherein the maximum distance of the operator proximity metrics are the same for all of the plural diagnostic apparatus.

11. A method of selectively communicating with an operator in a laboratory environment having plural diagnostic apparatus, comprising:
    providing an indoor positioning system with respect to the laboratory environment, the indoor positioning system for detecting the presence of at least one operator within the laboratory environment and for detecting the location of the at least one operator relative to at least one of the plural diagnostic apparatus;
    providing a process management platform implemented by a computer server and at least one associated database for storing a laboratory environment asset site map and for storing operator proximity metrics for defining a maximum distance from each of the plural diagnostic apparatus for a user to be determined proximate thereto, the process management platform in communication with each of the plural diagnostic apparatus, for selectively receiving status information therefrom, and in communication with the indoor positioning system, for selectively receiving the detected location of the at least one operator, the process management platform for determining the proximity of the at least one operator to at least one of the plural diagnostic apparatus through reference to the laboratory environment asset map;

providing a signaling device to a respective operator within the laboratory environment, the signaling device in communication with the process management platform; and selectively providing operator information to the respective operator via the signaling device in response to a communication from the process management platform when the process management platform determines the respective operator is proximate to a respective one of plural diagnostic apparatus on the basis of the detected location of the respective operator and the operator proximity metrics, the provided information pertaining to the respective one of the plural diagnostic apparatus;

wherein the received diagnostic apparatus status information is priority classified by the process management platform according to predefined response rules stored in the at least one associated database and each diagnostic apparatus has associated therewith in the at least one associated database plural operator proximity metrics, each operator proximity metric correlated with a respective priority classification of respective received diagnostic apparatus status information, and wherein an operator proximity metric correlated with a low priority classification is shorter than an operator proximity metric correlated with a high priority classification.

12. The method of claim 11, further comprising deriving the operator information from the status information for a respective diagnostic apparatus to which the respective operator is proximate and for communicating the operator information to the signaling device.

13. The method of claim 12, wherein the operator information comprises at least some of the status information for the respective diagnostic apparatus to which the respective operator is proximate.

14. The method of claim 12, wherein the operator information comprises instructions for actions the respective operator is to execute with respect to the respective diagnostic apparatus to which the respective operator is proximate.

15. The method of claim 12, wherein the operator information is an alert message directing the respective operator to address a functional degradation of the respective diagnostic apparatus.

16. The method of claim 15, wherein the alert message causes the signaling device to provide a tactile signal to the respective operator.

17. The method of claim 15, wherein the alert message comprises at least one of an audible and a visual signal.

18. The method of claim 11, wherein the step of providing a signaling device comprises providing a signaling device selected from the group consisting of a wirelessly communicating wristwatch, a wirelessly communicating wristband, a smartphone, and a wirelessly communicating tablet computer.

19. The method of claim 11, wherein the maximum distance of the operator proximity metrics are the same for all of the plural diagnostic apparatus.

* * * * *